(12) United States Patent
Schnitzer

(10) Patent No.: US 9,233,706 B2
(45) Date of Patent: Jan. 12, 2016

(54) STEERING SHAFT BEARING UNIT FOR ROTATABLY MOUNTING A STEERING SHAFT

(75) Inventor: Rony Schnitzer, Ruggell (LI)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 16 days.

(21) Appl. No.: 14/352,858

(22) PCT Filed: Sep. 5, 2012

(86) PCT No.: PCT/EP2012/003719
§ 371 (c)(1),
(2), (4) Date: Sep. 4, 2014

(87) PCT Pub. No.: WO2013/056765
PCT Pub. Date: Apr. 25, 2013

(65) Prior Publication Data
US 2015/0000456 A1 Jan. 1, 2015

(30) Foreign Application Priority Data

Oct. 19, 2011 (DE) .......................... 10 2011 054 598

(51) Int. Cl.
B62D 1/184 (2006.01)
B62D 1/189 (2006.01)
F16C 27/00 (2006.01)
(Continued)

(52) U.S. Cl.
CPC  B62D 1/189 (2013.01); B62D 1/16 (2013.01);
B62D 1/184 (2013.01); F16C 27/00 (2013.01);
F16C 43/00 (2013.01); F16C 2326/24
(2013.01); Y10T 29/49643 (2015.01)

(58) Field of Classification Search
CPC .......... B62D 1/16; B62D 1/184; B62D 1/185;
B62D 1/187; B62D 1/189; F16C 43/00;
F16C 27/00; F16C 2326/24; Y10T 29/49643
See application file for complete search history.

(56) References Cited

U.S. PATENT DOCUMENTS 5,239,888 A   8/1993  Sevault et al.
5,377,555 A   1/1995  Hancock
(Continued)

FOREIGN PATENT DOCUMENTS

DE   696 02 206   11/1999
DE   603 00 128   4/2005
(Continued)

OTHER PUBLICATIONS

International Search Report (ISR) issued Nov. 30, 2012 in International (PCT) Application No. PCT/EP2012/003719.

Primary Examiner — Laura Freedman
(74) Attorney, Agent, or Firm — Wenderoth, Lind & Ponack, L.L.P.

(57) ABSTRACT

A steering shaft bearing unit for rotatably mounting a steering shaft of a steering column for a motor vehicle includes at least one circumferentially closed region for accommodating at least one bearing for rotatably mounting the steering shaft, and at least one securing region for securing the steering shaft bearing unit to a console part of the steering column. At least one through-hole, in particular two through-holes, for guiding a clamping bolt of the steering column therethrough is/are arranged in the securing region. The securing region and the circumferentially closed region are designed as separate parts that are then preferably directly interconnected, preferably welded together.

16 Claims, 6 Drawing Sheets

(51) Int. Cl.
  *F16C 43/00* (2006.01)
  *B62D 1/16* (2006.01)

(56) References Cited

U.S. PATENT DOCUMENTS

| | | | |
|---|---|---|---|
| 5,730,465 A | 3/1998 | Barton et al. | |
| 5,927,152 A | 7/1999 | Marzio et al. | |
| 6,357,317 B1* | 3/2002 | Livengood et al. | 74/493 |
| 6,467,807 B2* | 10/2002 | Ikeda et al. | 280/775 |
| 7,350,813 B2 | 4/2008 | Inoue | |
| 7,413,222 B2* | 8/2008 | Higashino et al. | 280/775 |
| 7,503,584 B2* | 3/2009 | Sawada | 280/775 |
| 7,607,694 B2 | 10/2009 | Shinohara et al. | |
| 7,735,391 B2 | 6/2010 | Osawa et al. | |
| 7,861,615 B2 | 1/2011 | Harris et al. | |
| 7,918,483 B2 | 4/2011 | Galehr et al. | |
| 8,616,580 B2 | 12/2013 | Maniwa et al. | |
| 8,991,862 B2* | 3/2015 | Schnitzer | 280/775 |
| 9,010,807 B2* | 4/2015 | Schnitzer | 280/779 |
| 9,022,427 B2* | 5/2015 | Schnitzer | 280/775 |
| 2002/0084644 A1 | 7/2002 | Rinker et al. | |
| 2002/0178857 A1 | 12/2002 | Matsumiya | |
| 2005/0016315 A1 | 1/2005 | Breuss et al. | |
| 2005/0242561 A1* | 11/2005 | Nishioka et al. | 280/775 |
| 2006/0048597 A1* | 3/2006 | Heiml | 74/492 |
| 2006/0151984 A1 | 7/2006 | Higashino et al. | |
| 2006/0156854 A1* | 7/2006 | Sawada et al. | 74/493 |
| 2007/0069513 A1 | 3/2007 | Kirihara et al. | |
| 2008/0178702 A1 | 7/2008 | Lutz | |
| 2008/0252056 A1 | 10/2008 | Moriyama et al. | |
| 2009/0044656 A1 | 2/2009 | Okada et al. | |
| 2009/0301254 A1 | 12/2009 | Appleyard et al. | |
| 2010/0018340 A1 | 1/2010 | Schnitzer et al. | |
| 2010/0282016 A1 | 11/2010 | Oehri et al. | |
| 2010/0294072 A1 | 11/2010 | Ishii et al. | |
| 2011/0259140 A1 | 10/2011 | Fevre | |
| 2012/0297917 A1 | 11/2012 | Mashimo et al. | |

FOREIGN PATENT DOCUMENTS

| | | |
|---|---|---|
| DE | 11 2009 000 027 | 8/2010 |
| EP | 0 502 761 | 9/1992 |
| EP | 0 600 700 | 6/1994 |
| EP | 0 770 537 | 5/1997 |
| EP | 1 125 820 | 8/2001 |
| EP | 0 794 103 | 10/2002 |
| EP | 1 359 082 | 11/2003 |
| EP | 1 535 824 | 6/2005 |
| EP | 1 547 902 | 6/2005 |
| EP | 1 553 002 | 7/2005 |
| FR | 2 729 361 | 7/1996 |
| GB | 2 431 980 | 5/2007 |
| JP | 10-7003 | 1/1998 |
| JP | 2002-302046 | 10/2002 |
| JP | 2004-161276 | 6/2004 |
| JP | 2004-196299 | 7/2004 |
| JP | 2010-234907 | 10/2010 |
| JP | 2011-25859 | 2/2011 |
| KR | 10-2012-0042328 | 5/2012 |
| WO | 01/81149 | 11/2001 |
| WO | 2007/026114 | 3/2007 |
| WO | 2009/121386 | 10/2009 |
| WO | 2009/138578 | 11/2009 |
| WO | 2011/070950 | 6/2011 |
| WO | 2013/056764 | 4/2013 |
| WO | 2013-056766 | 4/2013 |
| WO | 2013/056771 | 4/2013 |

* cited by examiner

STEERING SHAFT BEARING UNIT FOR ROTATABLY MOUNTING A STEERING SHAFT

BACKGROUND OF THE INVENTION

The present invention relates to a steering shaft bearing unit for the rotatable support of a steering shaft of a steering column for a motor vehicle. The steering shaft bearing unit comprises at least one circumferentially closed region for receiving at least one bearing for the rotatable support of the steering shaft and at least one securement region for securing the steering shaft bearing unit on a bracket part of the steering column. In the securement region, at least one through-opening, in particular two through-openings, is or are disposed for guiding through a clamp bolt of the steering column.

The invention further relates also to a steering column with such a steering shaft bearing unit as well as a method for the production of the steering shaft bearing unit.

EP 1 535 824 B1, EP 1 547 902 A1, EP 1 553 002 B1, U.S. Pat. No. 7,350,813 B2 and JP 10-7003 disclose generic steering shaft bearing units, all of which have in common that the steering shaft bearing unit is widened in the securement region in order to provide suitable securement areas for securing in position the steering shaft bearing unit on a bracket part and therewith on a motor vehicle body. The widening of the jacket metal sheet in the securement region entails two significant disadvantages. For one, the widening leads to a thinning-out and therewith to a weakening of the jacket metal sheet in this region. For another, the process of widening the jacket metal sheet is tied to increased technical expenditures.

The invention therefore addresses the problem of providing a generic steering shaft bearing unit which can be produced as simply and as cost-effectively as feasible and yet meets high demands made of its rigidity.

SUMMARY OF THE INVENTION

The above object is attained according to the invention through a steering shaft bearing unit and a method as described below.

In the steering shaft bearing unit, it is consequently provided that the securement region and the circumferentially closed region are initially developed as separate structural parts and subsequently joined, preferably directly and preferably welded together.

It is herein advantageous if the securement region and the circumferentially closed region(s) is or are directly connected with one another. A preferred joining capability is welding. The securement region preferably comprises two through-openings for guiding through the clamp bolt.

A fundamental concept of the invention is consequently joining a steering shaft bearing unit from several prefabricated structural parts. One of the joined structural parts is the securement region and at least one other is a circumferentially closed region which serves for receiving at least one bearing for the rotatable support of the steering shaft.

Through the initially separate fabrication of these structural parts, it is feasible to produce the structural parts quickly and cost-effectively. The joining together, in particular by welding, can also be completed simply and cost-effectively. The steering shaft bearing unit can thereby be manufactured in a highly economical manner. It is, moreover, unproblematic in this approach to meet the required demands made of rigidity.

It is preferably provided that the structural parts forming the securement region and the circumferentially closed region or the circumferentially closed regions are disposed sequentially in the direction of the longitudinal axis of the steering shaft. The securement region and the particular circumferentially closed region can herein be connected abutting one another or at least regionally overlapping. Such overlaps can serve, for example for developing connection regions in which the securement region and the circumferentially closed region are connected with one another. This can be useful or even necessary with different connection types such as welding, bolting and the like.

Especially preferred embodiments of the invention provide that the securement region is developed unitarily. It is thus possible, for example, to develop this securement region preferably precisely as an extruded profile. The securement region can alternatively also be developed preferably precisely, for example, as a reformed sheet metal part.

Other variants provide for the securement region to be assembled, preferably welded together, from several parts. These parts can also be extruded profiles or reformed sheet metal parts or cast parts. It is in any case advantageous in this context if the steering shaft bearing unit is at least regionally circumferentially closed in the securement region.

The circumferentially closed regions for receiving at least one bearing can also be prefabricated unitarily, for example also as extruded profiles or reformed sheet metal parts. It is conceivable, for example, for these regions to be developed as tubular pieces and subsequently be secured on the securement region. It is understood that it is also feasible for the securement region to be assembled, preferably welded together, from several parts. The assembly of several extruded profiles and/or of reformed sheet metal parts is here also an option.

A method for the production of a steering shaft bearing unit according to the invention advantageously provides that the securement region and the circumferentially closed region are initially developed as separate structural parts and subsequently are connected, preferably welded, with one another, preferably directly.

Preferred embodiments of the invention provide for each steering shaft bearing unit to comprise at least two circumferentially closed regions to receive at least one bearing for the rotatable support of the steering shaft and for the securement region to be disposed between the circumferentially closed regions. Variants that are especially advantageously producible provide that they involve precisely two circumferentially closed regions for each of them to receive at least one bearing. The circumferentially closed region or regions of the steering shaft bearing unit for receiving at least one bearing can be developed tubularly.

In these embodiments, the individual circumferentially closed regions are advantageously not connected directly with one another but rather exclusively via the securement region disposed between them. In these terms, it is consequently advantageous if the circumferentially closed regions are exclusively connected with one another via the securement region disposed between them.

However, it can also be provided that the steering shaft bearing unit comprises precisely only one circumferentially closed region for receiving at least one bearing for the rotatable support of the steering shaft. A second bearing for the steering shaft can in this case be disposed for example in a steering power assistance unit or in the bracket part of the steering column.

Variants of the invention can also provide that the securement region comprises at least two securement webs spaced apart from one another. These, preferably each, can comprise freely projecting ends. However, it can also be provided that in each securement web one of the through-openings is disposed. For further rigidification it can be provided that the freely projecting ends of the securement webs are connected with one another by means of a separate connection metal sheet. Especially preferred variants provide that the connection metal sheet has a V-shaped cross section. The separate connection metal sheet can be secured, for example by means of welding, on the securement webs and in particular on their freely projecting ends. The recurvature region of the V-shaped cross section of the connection metal sheet extends advantageously parallel to a longitudinal axis of the steering shaft. It is especially advantageous if this recurvature region or the tip of the V shape of the separate connection metal sheet is longitudinally extended. It can extend with its longitudinal extent in a plane of symmetry of the securement region.

To increase the rigidity of the steering shaft bearing unit in particular in the region of the securement webs, in the steering shaft bearing unit, at least one steering shaft bearing unit bead is disposed. The, preferably each, through-opening can preferably in each case be disposed in a steering shaft bearing unit bead. Especially preferred embodiments of the invention provide in this context that the steering shaft bearing unit comprises precisely two steering shaft bearing unit beads, and that in each steering shaft bearing unit bead is disposed one through-opening for guiding through a clamp bolt known per se. Each freely projecting securement web advantageously comprises precisely one steering shaft bearing unit bead in each of which one through-opening is disposed. The steering shaft bearing unit beads are advantageously disposed in the proximity of the freely projecting end regions of the securement webs. The through-openings are preferably elongated holes. It is furthermore advantageous for the through-opening to be disposed in the bead base of the steering shaft bearing unit bead. It is especially advantageous for the through-opening to be disposed approximately symmetrically between the side walls or margins delimiting the bead base and extending approximately parallel.

The steering shaft bearing unit beads advantageously involve so-called inner beads. These are characterized thereby that the steering shaft bearing unit bead or beads is or are developed as bead or beads recessed in the direction into an internal volume of the securement region.

Preferred embodiments of the invention provide that the steering shaft bearing unit is developed in the securement region and/or in the circumferentially closed region for the reception of at least one bearing and/or at all sites as a single wall. This applies in particular to the securement region, however, preferably also to the circumferentially closed region for receiving at least one bearing for the rotatable support of the steering shaft.

The steering shaft bearing unit is preferably comprised of a metal, preferably of sheet metal. The metal is preferably steel, aluminum, magnesium or alloys comprising these metals. However, compound materials, for example composite carbon fiber materials, or cast parts or a mixture of said materials can also be employed.

Apart from the steering shaft bearing unit, the invention also relates to a steering column for a motor vehicle with a bracket part provided for securing the steering column in position on a motor vehicle body, which bracket part comprises at least two side jaws, wherein a steering shaft bearing unit according to the invention is disposed with its securement region between the side jaws and retained on the side jaws by means of the securement webs.

The steering columns according to the invention advantageously involve so-called adjustable steering columns. As is known, these are characterized thereby that the position of the steering shaft, including the steering shaft bearing unit, is adjustable with respect to the bracket part. The position of the steering wheel can hereby be adapted to the particular driver of the motor vehicle. Especially preferred embodiments of steering columns according to the invention provide that the steering shaft is adjustable in its length direction and/or in a height direction orthogonal to the length direction.

Preferred embodiments of such steering columns provide that, between at least two, preferably precisely two, side jaws of the bracket part provided for the securement of the steering column on a body of a motor vehicle, the steering shaft bearing unit is bearing supported for the rotatable support of the steering shaft of the steering column. In preferred embodiments between the side jaws of the bracket part and the steering shaft bearing unit is disposed a bearing part. A clamp bolt of the steering column can penetrate the side jaws of the bracket part and the bearing part and the steering shaft bearing unit. The bearing part can herein comprise at least one bearing part bead and the steering shaft bearing unit can comprise at least one steering shaft bearing unit bead, wherein the bearing part bead is at least regionally areally in contact on the steering shaft bearing unit bead. In such embodiments is especially preferably provided for the clamp bolt to penetrate the bearing part in the bearing part bead and the steering shaft bearing unit in the steering shaft bearing unit bead.

The steering column according to the invention can advantageously be implemented such that it can be set in its height, which is identical to inclination, and/or in its length. Preferred are generally cost-effective height- and length-adjustable steering columns which comprise a securement device that makes possible the optional enabling (=open state of the securement device) or fixing (=closed state of the securement device) of the particular displacement direction. The clamp bolt, as a part of such a securement device, together with further clamping parts, such as for example a tightening piece, a cam plate, a clamping nut, can herein serve in simple manner for the optional enabling or fixing of the feasible adjustment in length directions and/or height direction in known manner, depending on the realization. Independently of fixing under form closure or force closure (also friction closure), it is always advantageous for high pressing forces to be applied in the closed state of the securement device onto the connections between steering shaft bearing unit and bearing part, on the one hand, and bearing part and bracket part, on the other hand.

Through the penetration of the clamp bolt through steering shaft bearing unit bead and bearing part bead the tightening forces exerted by the clamp bolt are directly transmitted to the two listed beads, such that, using a simple construction, high forces can be transmitted. This aids also in reducing the number of structural parts. In the open state, in which no or only minimal tightening forces are transmitted via the clamp bolt, high guide precision in the adjustment is also attained. The rigidity can herein be further increased if the bearing part and the steering shaft bearing unit on the surfaces oriented parallel to the two side jaws comprise on both sides of the steering shaft correspondingly one steering shaft bearing unit bead and one bearing part bead, which are penetrated by a clamp bolt. This also aids in reducing the number of structural parts and/or the material utilization for the production of the steering column. In the open state, in which no or only minimal tightening forces are transmitted via the clamp bolt, through the assembly according to the invention a low-play guide system is attained without large expenditures. To the driver of the motor vehicle consequently in this state, a stable and full sensation is also conveyed when handling the steering wheel attached on the steering shaft of the steering column. The bearing part bead and the steering shaft bearing unit bead, as well as a bracket part bead optionally also provided and discussed below, are advantageously developed such that they correspond to one another. It is in these terms also preferred for the bearing part bead to be developed, viewed in a section plane through a longitudinal center axis of the clamp bolt, geometrically similar to the steering shaft bearing unit bead. The same applies advantageously also to a bracket part bead if such is provided. It is further also advantageous if the bearing part bead and/or the steering shaft bearing unit bead and/or the optionally provided bracket part bead is or are developed axisymmetrically with respect to a longitudinal center axis of the clamp bolt.

It is advantageous for the beads to each be in contact, preferably in pairs, with their side walls on one another. However, in order to be able to transmit especially high tightening forces in the axial direction, preferred embodiments of the invention provide that the bearing part bead and the steering shaft bearing unit bead and, if provided, also the bracket part bead comprise each side walls and a bead base connecting the side walls. Especially advantageous is the development of side walls in the particular beads which are inclined in the range of 30° to 60°, preferably 45° to 60°, with respect to the bead base. In the closed state of the securement device the bearing part bead and the steering shaft bearing unit bead are, preferably pairwise, under prestress in contact on one another with their side walls. The clamp bolt is advantageously guided through an opening in the particular bead base.

The development of the bead base in the bearing part bead, as well as also in the steering shaft bearing unit bead oriented parallel, or at least nearly parallel, with respect to one another enables the compensation of tolerances with the simultaneous increase of the contact tension in the contact between the side walls of the two beads. In this case, the two bead bases are not in contact on one another in the closed state of the securement device. However, alternatively, it is also conceivable and feasible with the restriction of the tolerance, to provide this contact between the particular bead bases to be straight or linear, wherein also a considerable pressing force increase onto the contact between the side walls is enabled.

As already addressed, preferred embodiments of the invention provide that each of the side jaws of the bracket part comprises at least one bracket part bead, and that the clamp bolt penetrates the side jaws in the bracket part bead, and the bracket part bead, preferably on two opposite sides of the clamp bolt, is at least regionally areally in contact on the bearing part bead.

By guiding the clamp bolt through the bearing part bead, the steering shaft bearing unit bead, and optionally also the bracket part bead, a highly compact construction method can be achieved. The clamp bolt can be disposed in close proximity on the steering shaft rotatably supported in the steering shaft bearing unit. This leads to an equally compact as well as also stable construction method. In addition, the forces transmitted via the clamp bolt act very directly onto said beads.

It is advantageously provided that the bolt penetrates centrally the bearing part bead and the steering shaft bearing unit bead as well as the optionally provided bracket part bead, which is further advantageous for a symmetric force introduction distributed over all side walls of the particular beads. The bead base advantageously has a width such that the clamp bolt can be guided completely through an opening in the bead base. The bead base can still comprise further regions lateral to said openings, with which regions it is braced on the bead bases of the other beads. The openings or cutouts in the beads or bead bases through which the clamp bolt is guided should advantageously be greater than the diameter of the clamp bolt such that the clamp bolt is not in direct contact on the margins of the openings or cutouts. This has the advantage that, for example in the event of a motor vehicle crash, no rotational movement of the clamp bolt is triggered. Moreover, the abrasion in the elongated holes is reduced.

For the sake of completeness, reference is made to the fact that the steering shaft bearing unit bead is a bead in the steering shaft bearing unit, the bearing part bead is accordingly a bead in the bearing part, and the bracket part bead, again, accordingly a bead in the bracket part. As is generally known, a bead is a channel-like indentation or grooving. Geometrically similar are two beads if they can be transformed one into the other through similarity mapping, e.g. a geometric mapping that can be combined from centric elongations and congruence mapping such as shifting, rotation or mirroring.

It is conceivable and feasible in terms of the invention to implement the beads as so-called inner beads or also as outer beads. The beads are preferably developed as so-called inner beads since in this case a simpler construction leads to a correspondingly stable steering column. Especially preferably by inner bead is to be understood in terms of the invention a bead whose base is recessed approximately perpendicularly to the plane of the side jaws in the direction toward the steering shaft, wherein the base extends substantially parallel to the plane of the side jaws. Hereby a compact construction method is attained. In addition, high forces can also be transmitted. It is consequently advantageous in these terms for the bearing part bead and the steering shaft bearing unit bead, and, if provided, also the bracket part bead to be developed as recessed in the direction into the region between the side jaws of the bracket part. In terms of an advantageous force transmission as effective as feasible, preferred variants provide furthermore that the bearing part bead on two opposing sides of the clamp bolt is at least regionally areally, or alternatively at least regionally in the form of a line, in contact on the steering shaft bearing unit bead. In terms of low-play guidance and the capability of being able to absorb high forces even in the event of a crash, especially preferred embodiments of the invention provide that the bearing part bead and/or the steering shaft bearing unit bead and/or the optionally provided bracket part bead is or are implemented such that they extend in the longitudinal direction. Hereby, an especially great guidance length, and therewith an ideal force bracing under torque loading, such as for example in the event of a crash, is provided.

Especially preferred embodiments of the invention provide that the bearing part is formed unitarily, for example of a curved, preferably curved in the shape of a U, strip of sheet metal. In terms of a stable bearing, the bearing part comprises at least two securement sites, spaced apart from one another, at which it can be secured directly or indirectly on the body of the motor vehicle. In these terms a preferred embodiment of the invention provides that the bearing part comprises at least at one site, spaced apart from the clamp bolt, a bearing part securement forming a fixed or a swivel joint for securing the bearing part on the body of the motor vehicle or on the bracket part. The bearing part securement can herein be reinforced or rigidified. In terms of a low-play bearing that is as stable as feasible, it is advantageous if the distance between clamp bolt and bearing part securement corresponds at least to half, preferably at least to three-fourths, of the length of the bearing part.

Preferred variants of the invention, as already stated, are implemented as so-called adjustable steering columns. It can be provided, for example, that the bearing part is swivellably bearing supported to provide height adjustability of the steering column. It can further be provided that the steering shaft bearing unit is displaceably supported in the bearing part to provide length adjustability of the steering column in the longitudinal direction of the steering shaft. Especially preferred embodiments of steering columns according to the invention are height adjustable as well as also length adjustable. They consequently comprise a combination of the last listed features. For the sake of completeness, however, reference is made to the fact that steering columns according to the invention can also be so-called rigid steering columns which do not have any of the listed adjustment capabilities.

It must also be taken into consideration that the features of the steering column described with respect to the beads can not only be employed in order to provide an adjustable steering column with as low a play as is possible. Rather, the penetration of said beads by the clamp bolt can also be utilized for the purpose of providing an energy absorption device for said rigid or also adjustable steering column thereby that said beads are developed as crash beads which are known per se and which become reformed in the event of a crash. Through the implementation of the beads, in the event of a crash a skidding-through via the bead guidance can be enabled for the energy absorption. In adjustable steering columns, in which said beads are additionally also implemented as crash beads, the regions of the beads relevant for the energy conversion in the event of a crash are advantageously located at the end of the displacement path for the steering column adjustment.

BRIEF DESCRIPTION OF THE DRAWINGS

Further features and details of preferred embodiments of the invention will be explained in conjunction with the following description of the drawings, in which.

DETAILED DESCRIPTION OF THE INVENTION

Figure 1:
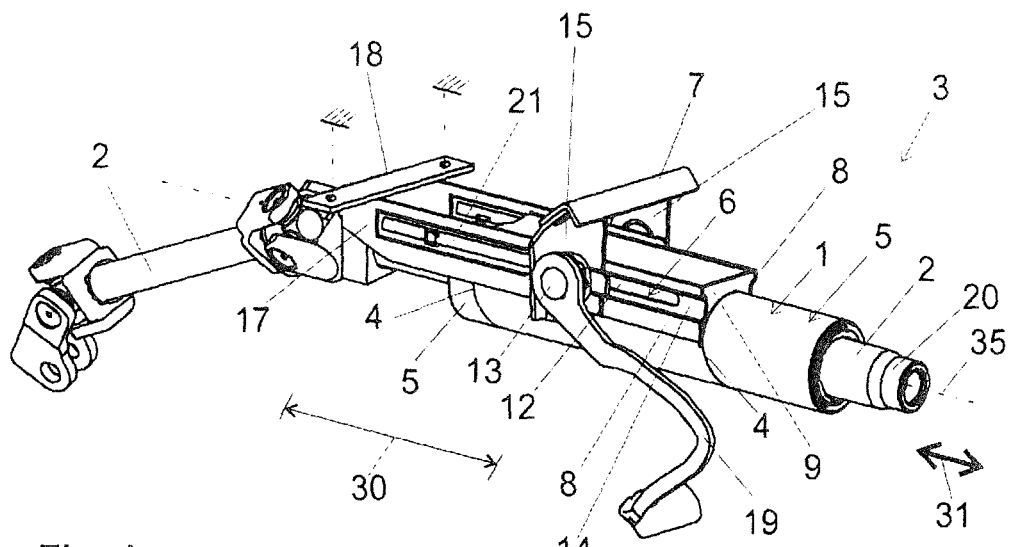
FIGS. 1 and 2 show a first embodiment according to the invention in the form of a length-adjustable steering column.
Figure 2:
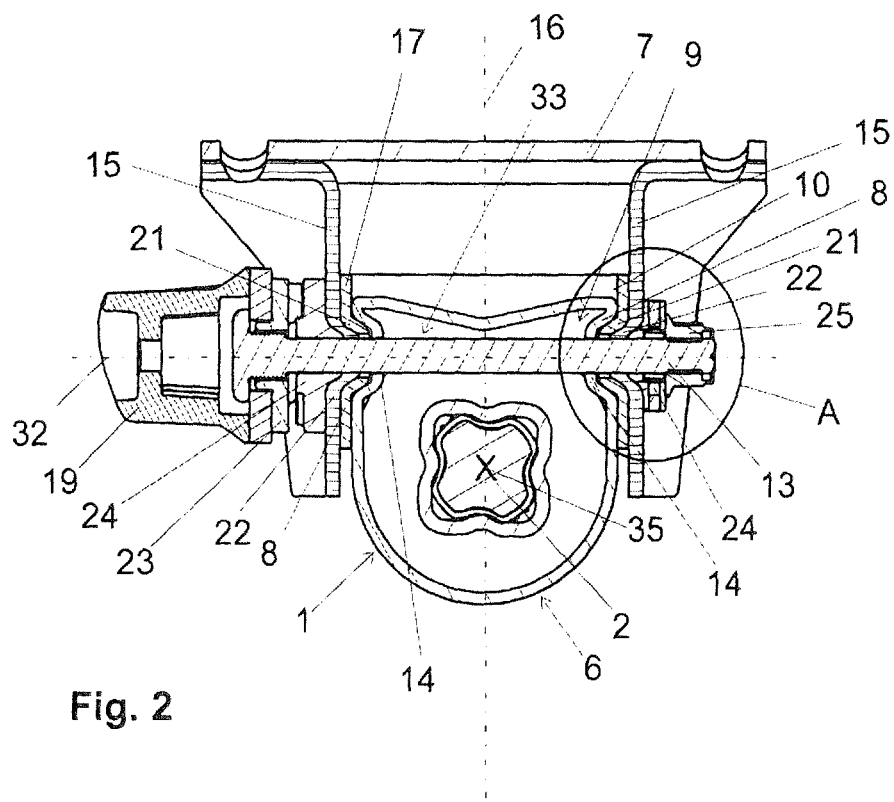

FIG. 1 depicts a first steering column 3 with a steering shaft bearing unit 1 according to the invention. By means of a bracket part 7, it can be secured on a body of a motor vehicle not shown here. FIG. 2 shows a vertical section through this steering column 3 along a clamp bolt 13. In particular FIG. 2 shows especially clearly that the bracket part 7 comprises two side jaws 15 between which the steering shaft bearing unit 1 is retained. In the steering shaft bearing unit 1 is supported the steering shaft 2 such that it is rotatable about its longitudinal axis 35. The steering wheel adapter 20 of the steering shaft 2 is provided for the securement of a steering wheel, not shown here, on the steering shaft 2. Between the side jaws 15 and the steering shaft bearing unit 1 is located the bearing part 17. At the end, facing away from the clamp bolt 13, the bearing part 17 is securable by means of the bearing part securement 18 in the depicted embodiment example on the body, not depicted here, of the motor vehicle.

Implementations are also conceivable in which the bearing part securement 18 is secured on the bracket part 7. In the first embodiment, the bearing part securement 18 is implemented rigidly in any case. The length of the bearing part 17 is provided with the reference number 30 in the drawing. As explained in the introduction, it is advantageous for the bearing part securement 18 to be as far removed from the clamp bolt 13 as is possible. As already explained, for this purpose the distance between clamp bolt 13 and bearing part securement 18 should be at least half, preferably at least three-fourths, of the length 30 of the bearing part 17.

The depicted embodiment according to FIGS. 1 and 2 involves a length-adjustable steering column 3. The displacement directions are denoted by the double arrow 31. This corresponds to the longitudinal directions of the steering shaft 2.

In order to enable, on the one hand, the displacement in the longitudinal directions 31, and to ensure on the other hand, a sufficiently strong securement during operation of the steering shaft bearing unit 1 on the bracket part 7, in the case of this steering column, as is known per se, a securement device is provided which, inter alia, encompasses the clamp bolt 13 and the actuation lever 19. It is understood that motor actuations of the securement device are also conceivable. In such cases, the actuation lever 19 can be omitted. Securement devices with clamp bolts 13 for adjustable steering columns 3 are known within prior art in a multiplicity of implementations. The embodiments depicted here serve only as illustration of one of many different feasible variants of the manner in which the clamping and release of the securement device can proceed.

In the depicted embodiment, a cam plate 23 is connected torque-proof with the actuation lever 19. The cams of this cam plate 23 cooperate with corresponding countercams of the tightening piece 24. The tightening piece 24 is connected torque-proof with the bracket part 7. On the opposite side, the clamp bolt 13 is fixed with a clamping nut 25. Here is also located a tightening piece 24 or an axial bearing which is disposed between the clamping nut 25 and the corresponding side jaw 15 of the bracket part 7. By turning the actuation lever 19 about the center longitudinal axis 32 of the clamp bolt 13, the cam plate 23 is turned against the tightening piece 24 disposed adjacently thereto. Depending on the position of the involved cams with respect to one another, the securement device is subsequently in the closed state in which the steering shaft bearing unit 1 is fixed on the bracket part 7 at least under the forces occurring in normal operation. Through the appropriate rotation of the actuation lever 19 the securement device can subsequently be brought into the open state in which a displacement in the longitudinal directions 31 of the steering shaft bearing unit 1 relative to the bracket part 7, and therewith a setting of the position of the steering wheel, is enabled. Such securement devices are known per se and do not need to be further explained here.

As is especially clearly evident in the sectional representation according to FIG. 2, the bearing part 17 as well as also the steering shaft bearing unit 1 have each beads with which they are supported one in the other. In the first embodiment, the particular bearing part bead 21 is guided in one of the steering shaft bearing unit beads 14. In the depicted first embodiment according to FIGS. 1 and 2, the bracket part 7 additionally also comprises at both side jaws 15 one bracket part bead 22 which, in the depicted embodiment, engages into one of the bearing part beads 21. The clamp bolt 13 is guided through the bearing part beads 21 and the steering shaft bearing unit beads 14. In the depicted embodiment, it is additionally also guided through the bracket part beads 22. It is conceivable and feasible, even in steering columns 3 which are only adjustable in length, to omit a bracket part bead 22. The side jaws 15 are in that case preferably implemented planarly in the proximity of the tightening and displacement, at least in the surface directed toward the steering shaft bearing unit.

As can be seen especially well in FIG. 2, it is advantageous if, as in this embodiment also realized, the beads are implemented as so-called inner beads. This is the case if they are implemented such that they are recessed in the direction into the region 33 between the side jaws 15 of the bracket part 7 or in the direction into the interior volume of the securement region 6 forming the region 33.

Region A from FIG. 2 is once again depicted in FIG. 2 at an enlargement. It can here be seen especially well that each of the beads 14, 21 and 22 comprises two side jaws 28 which are connected with one another by means of a bead base 29. The clamp bolt 13 penetrates in each instance the bead base 29 of said beads 14, 21 and 22. The cutout or opening necessary for this purpose is advantageously only large enough for there still being present lateral margins of the bead base 29. This enables greater rigidity in the contact of the bearing part bead 21 on the particular steering shaft bearing unit bead 14 since thereby, in the direction of the center longitudinal axis 32 of the clamp bolt 13, forces can be transmitted especially well. The side walls 28, and here also the bead bases 29 of the particular adjacent beads 14, 21 and 22 are fully in areal contact on one another. They are symmetric with respect to the center longitudinal axis 32 of clamp bolt 13 and, in terms of optimal contact on one another, have a geometrically similar form. In the first embodiment example according to FIGS. 1 and 2 the tightening pieces 24, engaging from the outside into the bracket part beads 22, comprise projections, formed out corresponding to the bead indentation, with which they engage into the bracket part beads 22. By guiding the clamp bolt 13 directly through the beads 14, 21, and here also 22, the clamping forces of the clamp bolt 13 act directly onto said beads whereby an equally simple as well as also effective construction method and force transmission is realized.

The through-opening 12, or the elongated hole forming it, is advantageously wider in the steering shaft bearing unit 1 than the diameter of hole 36 in the bearing part 17. The diameter of hole 37 in the bracket part 7 is advantageously smaller than the diameter of hole 36 in the bearing part 17. In this way the abrasion can be reduced. It is also conceivable and feasible for the production of a greater displacement length to implement the hole 36 as an elongated hole. In that case, instead of the diameter of hole 36, the width of the elongated hole would have to be assessed as the measure of the above comparisons.

In general, reference should be made to the fact that through the construction according to the invention a highly compact construction method is made possible thereby that the spacing between the clamp bolt 13 and the steering shaft 2 can be kept very low. This is preferably made possible through a single-wall implementation in which the steering shaft bearing unit 1 is formed by only a single, preferably circumferential wall, apart from potentially possible attachment parts, which may be attached for additional functions. In this way between the clamp bolt 13 and the steering shaft 2 no walls are located with corresponding wall thicknesses and require increased minimum spacing between steering shaft 2 and clamp bolt 13. In this context, thus, as also realized here, it is advantageously provided that at least a longitudinal section of the clamp bolt 13 for each set adjustment position the space between the longitudinal section of the clamp bolt 13 and of the steering shaft 2 is free of wall sections of the steering shaft bearing unit and/or of other structural parts. Stated differently, it is consequently provided in this region that only air is exclusively found between the steering shaft 2 and the clamp bolt 13. The longitudinal section of the clamp bolt 13 advantageously spans the entire length of the clamp bolt 13, which is located between the inner sides of the side jaws 15 or the bead bases 29. It is herein also advantageous if the steering shaft 2 and the clamp bolt 3 or its longitudinal section do not intersect. It is further advantageous if the steering shaft with its outer circumference does not project into the clamp bolt 13, or its longitudinal axis, guided, preferably orthogonally, past it.

In the first embodiment, each steering shaft bearing unit bead 14 comprises as the through-openings 12 an elongated hole through which the clamp bolt 13 is guided. Through these elongated holes extending longitudinally in the longitudinal direction 31 of the steering shaft 2 it becomes feasible to displace the steering shaft bearing unit 1 in the longitudinal directions 31 relative to the bracket part 7.

The bearing part beads 21 and the bracket part beads 22 do not need to be implemented such that they extend longitudinally. Through the longitudinal extent of the bearing part 17 over its length 30 and the disposition of the bearing part securement 18, remote from the clamp bolt 13 in the longitudinal direction 31, a highly torsion-resistant and low-play bearing of the steering shaft bearing unit 1 is attained. Yet the torsion resistance of the construction can be still further increased thereby that, as realized in the first embodiment, the bearing part beads 21 also are longitudinally extended. The engagement of the bearing part beads 21 into the steering shaft bearing unit beads 14 is thereby, as realized in the first embodiment, markedly extended in the longitudinal direction 31 which further increases the torsion resistance of the overall construction.

Figure 3:
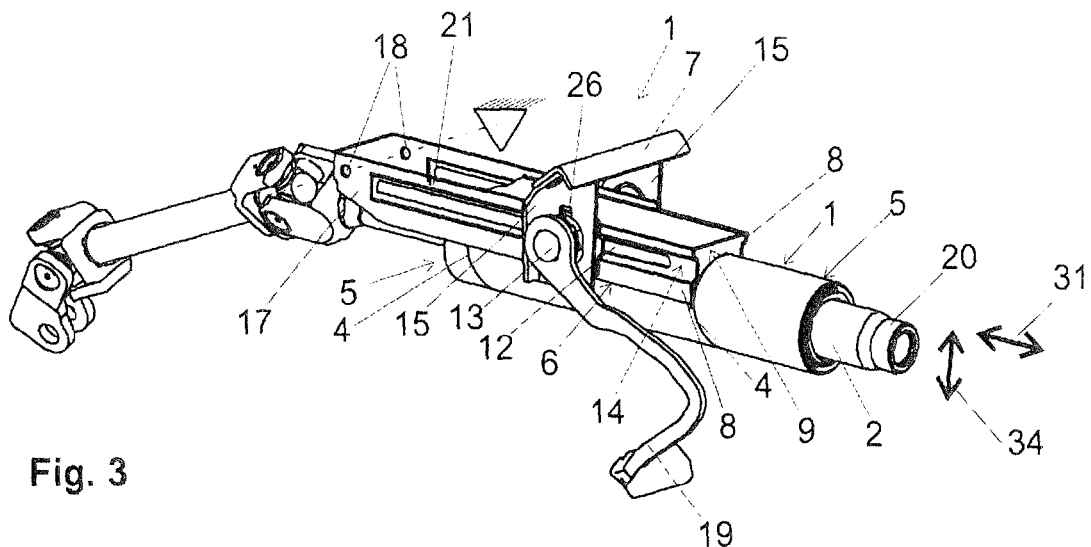
FIGS. 3 and 4 show a second steering column implemented according to the invention which is height- and length-adjustable.
Figure 4:
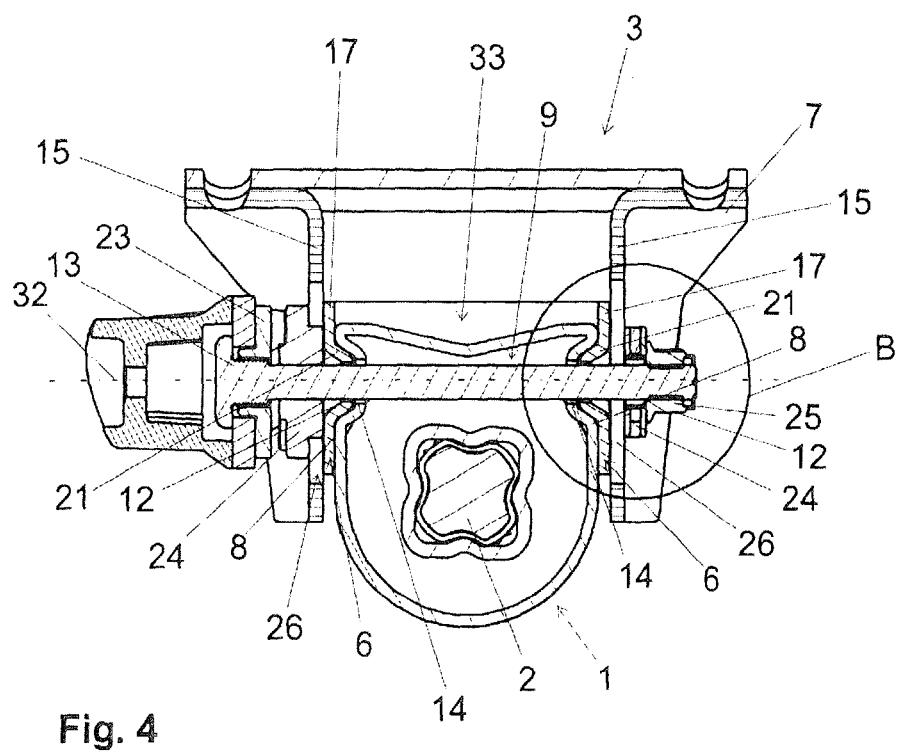

Before discussing the embodiment according to FIGS. 3 and 4, reference should be made to the fact that in all of the embodiments shown the particular bead configurations are realized bilaterally, thus on both side jaws 15 of the bracket part 7. This is advantageous in terms of a low-play rigid structure. However, it is not absolutely necessary. It would also be conceivable to realize the corresponding bead configurations in the region of only one of the side jaws 15.

In the embodiment according to FIGS. 3 and 4, in addition to the length adjustability of the steering column 3 in the longitudinal direction 31, a height adjustability of this steering column 3 or its steering shaft 2 in the height directions 34 is provided. For this purpose, in each of the two side jaws 15 of the bracket part 7 in this embodiment a vertically extending elongated hole 26 is disposed in which the clamp bolt 13 is disposed such that it is longitudinally displaceable. Height as well as also length adjustment, however, are only possible when the securement device is in its open state. In the closed state of the securement device these adjustment capabilities are not given, at least not under the forces occurring during normal operation.

Figure 6:
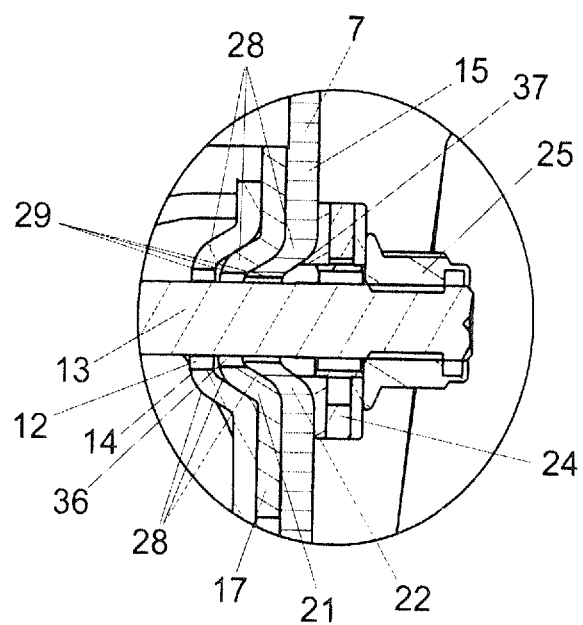
FIG. 6 show the region A from FIG. 2.
Figure 7:
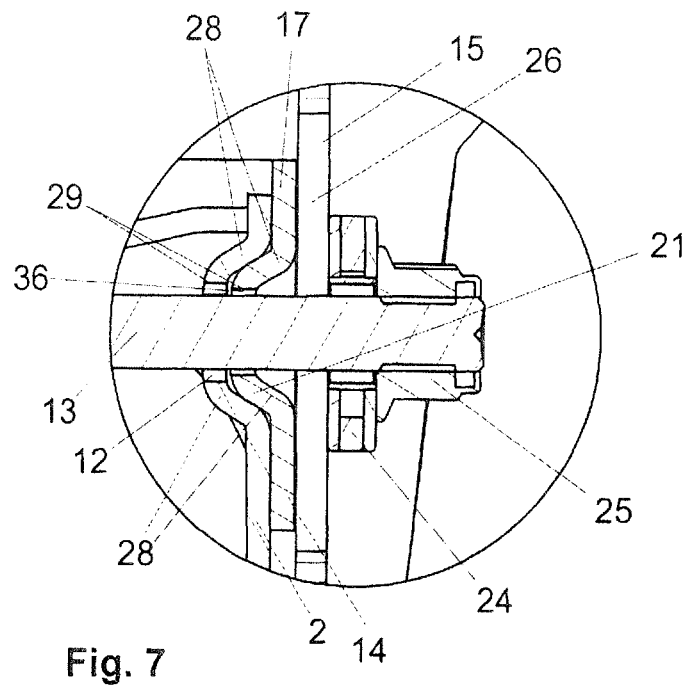
FIG. 7 shows the region B from FIG. 4.

In order to be able to realize the height adjustability in the height directions 34 also, in the embodiment example according to FIGS. 3 and 4 the bearing part securement 18 of bearing part 17 comprises a swivel joint. The bearing part 17 can be swiveled, together with the steering shaft bearing unit 1, about this swivel joint of the bearing part securement 18 about a swivel axis 38 when a height adjustment is carried out. A further difference from the first embodiment comprises that in this variant a bracket part bead is omitted on both side jaws 15. The elongated holes 26 are provided on the side jaws 15 on both sides. The tightening pieces 24 in this embodiment also do not comprise noses with which they would engage into the beads. It is nevertheless provided that the bearing part beads 21 are in contact in the steering shaft bearing unit beads 14 and that the clamp bolt 13 penetrates through these beads. All of this is once again shown in FIG. 7 at an enlargement by depicting in this Figure the detail B from FIG. 4. As far as applicable, the description provided in conjunction with FIG. 6 applies to this Figure also with the exception of the differences already stated.

Apart from the differences, the embodiment according to FIGS. 3 and 4 is substantially implemented like the first embodiment such that additional explanations in this regard are superfluous.

Figure 5:
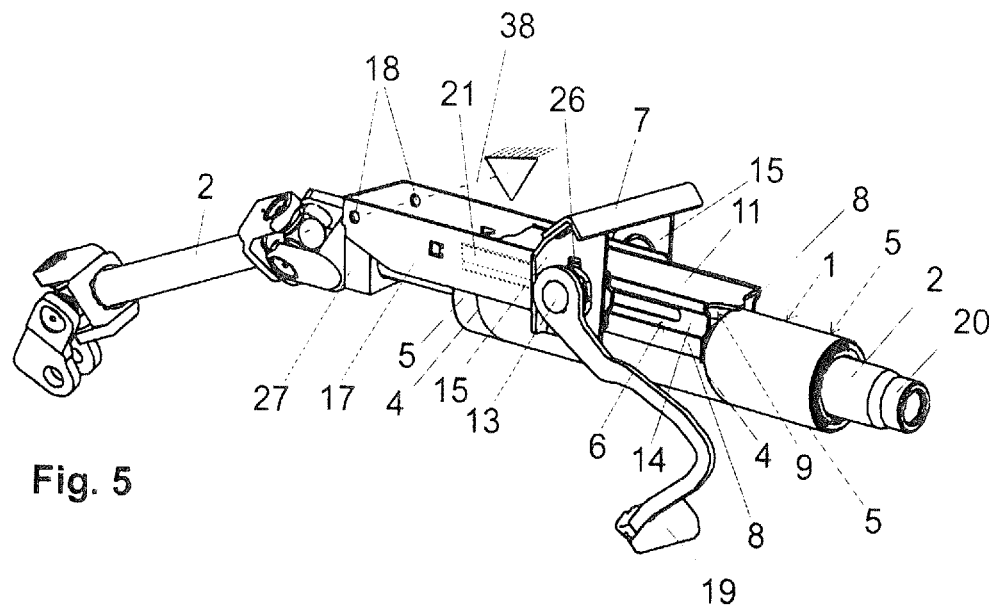
FIG. 5 shows a modification of the second embodiment example according to the invention.

In general, reference is to be made to the fact that the steering shaft 2 is preferably rotatably at least doubly supported at two sites, spaced apart from each other, of the steering shaft bearing unit 1, here in the circumferentially closed regions 5 of the steering shaft bearing unit 1, which bearings are here not explicitly drawn but are known per se. In the modified variant of the embodiment according to FIGS. 3 and 4 depicted in FIG. 5, a steering shaft bearing 27 is provided at the motor-side end of the bearing part 17. In all other regards, this embodiment according to FIG. 5 corresponds to the variant according to FIGS. 3 and 4. It is also conceivable and feasible to secure this additional steering shaft bearing 27 directly on the motor vehicle body, not shown here, or to integrate it into a gearing, not shown here, for a power assistance of the steering movement. It is, in particular for these cases, conceivable and feasible to rotatably support the steering shaft at one single bearing in the steering shaft bearing unit 1.

Figure 8:
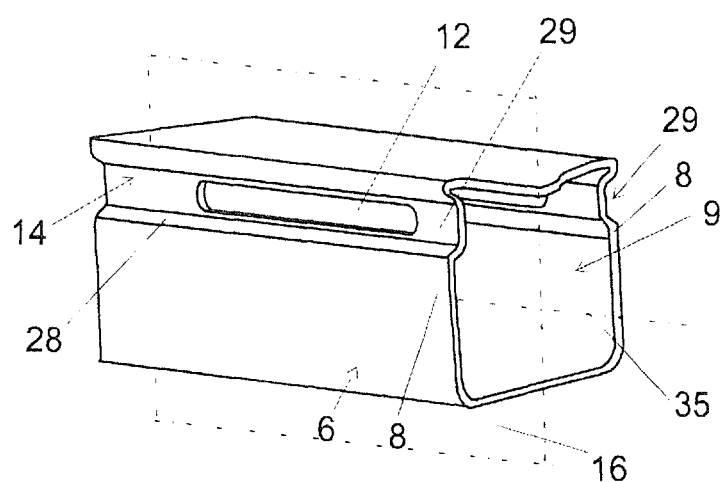
FIG. 8 shows an example of the manner in which the securement region can be implemented unitarily.
Figure 9:
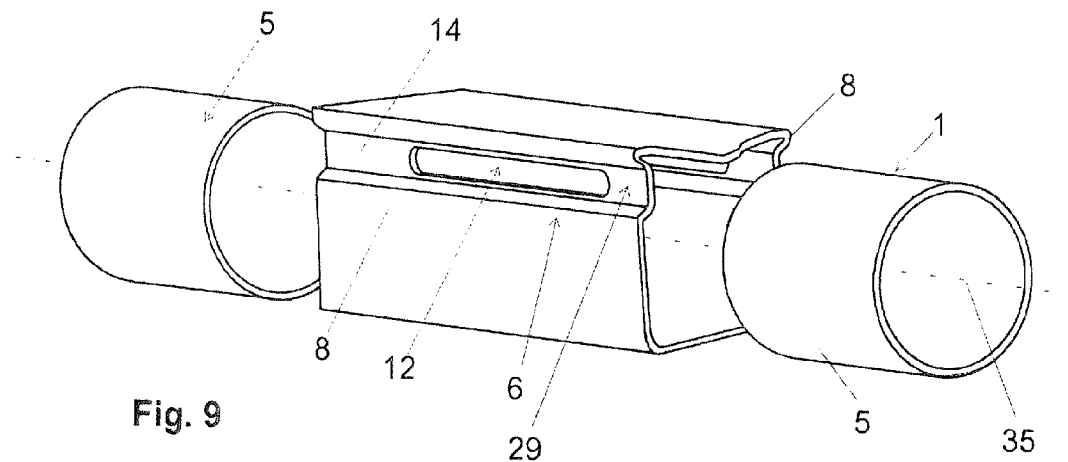
FIGS. 9 and 10 are depictions regarding the implementation of a steering shaft bearing unit according to the invention with the securement region according to FIG. 8.
Figure 10:
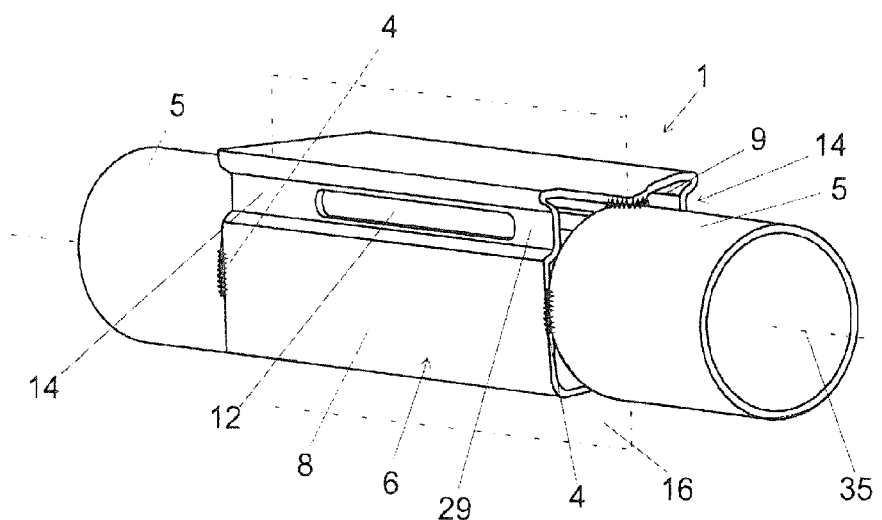

FIG. 10 shows separately, thus isolated from the remaining steering column 3, the steering shaft bearing unit 1 according to the invention such as can be installed in the embodiment examples of steering column 3 according to FIGS. 1 to 5, however, also in other variants according to the invention. The variants according to the invention are, as stated, characterized thereby that the securement region 6 and the circumferentially closed region 5 are initially developed as separate structural parts and are subsequently connected, preferably welded together, preferably directly. FIG. 9 shows the three structural parts before they are connected in a type of exploded view. FIG. 8 shows the securement region 6 of the steering shaft bearing unit 1 depicted in FIG. 10.

As already explained, it is a fundamental concept of the invention to fabricate the individual structural parts of the steering shaft bearing unit initially separately and to connect them with one another subsequently. It becomes hereby very simple to realize different cross sectional shapes, wall thicknesses and the like in different regions of the steering shaft bearing unit and, nevertheless, provide an especially stable and rigidly connected steering shaft bearing unit 1. As is especially clearly evident in FIG. 8, the securement region 6 of this embodiment example is developed unitarily, thus as one piece. It can be, for example, a circumferentially closed extruded profile in this example, such as can be produced cost-effectively in large numbers of pieces. It is alternatively also feasible to develop the securement region, or the structural part forming it, as a reformed sheet metal part or as a cast part or as, for example, a carbon fiber reinforced composite material part. In the depicted embodiment in the securement webs 8 of this securement region 6, a steering shaft bearing unit bead 14 is also disposed. In their particular bead base 29 is located the through-opening 12 implemented in the form of an elongated hole. Drawn in FIG. 8 is also the plane of symmetry 16 of the securement region 6 as well as the longitudinal axis 35 of the steering shaft 2 of steering column 3 not depicted in FIGS. 8 to 10.

The circumferentially closed regions 5 depicted in FIG. 9 for receiving a bearing for supporting the steering shaft 2 in the depicted embodiment are developed in the form of a cylindrical jacket or tubularly. These can be simple tube sections which can be obtained very cost-effectively. However, these may also involve differently formed-out cross sections. The structural parts forming the regions 5 can also be produced as a reformed sheet metal part or an extruded profile or cast part or, for example, a carbon fiber reinforced composite material part. Through the initially separate implementation of regions 5 and securement region 6 and their subsequent connection, it becomes in any event feasible to realize cost-effectively highly different cross sectional shapes in the discrete sections of the steering shaft bearing unit 1. Through the connecting and welding of these individual structural parts at the welding seams 4 it is subsequently cost-effective to produce the entire steering shaft bearing unit 1. As also illustrated in this embodiment according to FIGS. 8 to 10, it is in any case advantageous if the structural parts forming the securement region 6 and the region(s) 5, are disposed, or connected with one another, sequentially in the longitudinal direction, thus in the direction of the longitudinal axis 35 of the steering shaft 2.

As already explained in the introduction, it can herein be provided for the securement region 6 and the region(s) 5 to be connected such that they abut one another. It is equally feasible, however, that between the securement region and the particular region 5 a certain overlap is realized. This can be advantageous, for example for the application of a welding seam or a bolt connection.

In the depicted embodiment, the securement region 6 is disposed centrally between two regions 5 for receiving at least one bearing for the support of the steering shaft 2. This arrangement is not absolutely necessary. It is also conceivable to dispose on the securement region 6 only a corresponding circumferentially closed region 5 for receiving the bearing. The steering shaft 2 can in this case also be supported at another site, or be uncoupled from the steering shaft bearing unit 1, for example in a power assistance device or another corresponding part of a bracket part 7.

To facilitate the connection between the securement region 6 and the at least one circumferentially closed region 5, additional shaped elements can be provided with which the structural parts can be positioned in orientation to each other before they are joined. Along these shaped elements the structural parts can be prepositioned in a type of clearance fitting or a minimal press fitting. In the following method step the structural parts are subsequently connected with one another, for example by welding, preferably by laser welding. In terms of an implementation as cost-effective as possible, it is preferably provided that, as also realized in the depicted embodiment according to FIGS. 8 to 10, for the steering shaft bearing unit 1 to be implemented at all sites entirely as a single wall. To weld the individual structural parts 5 and 6 together, classic welding methods can be utilized, just as in the corresponding shaping orbital friction welding or laser welding can be utilized. The embodiment with several assembled structural parts has the advantage that the structural parts can be implemented highly appropriate for manufacture and/or interface considerations. It is thus especially simply feasible to provide different wall thicknesses at different sites. In this case, for example, the circumferentially closed regions for receiving each at least one bearing for the support of the steering shaft 2 can be implemented more thin-walled than the securement region 6. The profile form in the interior of the regions 5 can also be round and the outside can be, for example, polygonal in order to enable simple installation into the body of different motor vehicles.

Reference should also be made to the fact that the securement region 6 and/or the region(s) 5 can also be structured of multiple parts. Thus, these structural parts individually can also be half shells, which, for example, can be assembled in the plane of symmetry 16. Precisely such technology is well suited for the production of the steering shaft bearing unit of a compound material such as, for example, a carbon fiber composite material.

Figure 11:
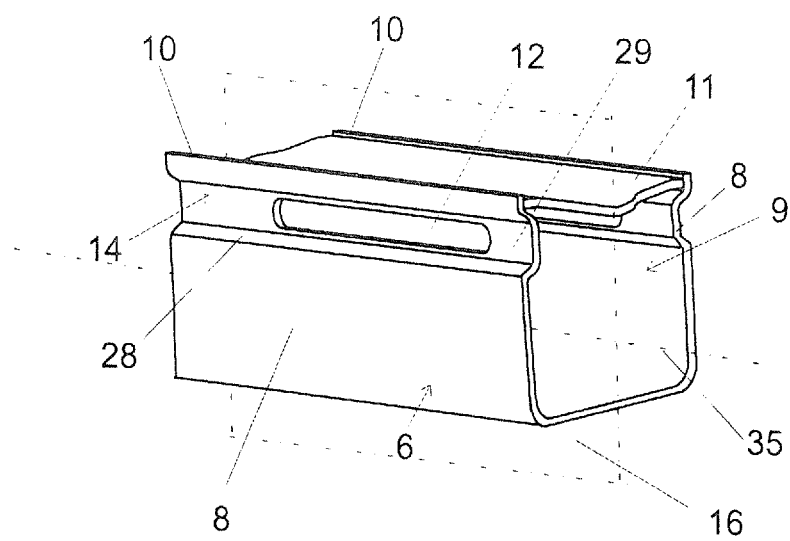
FIG. 11 shows an alternative embodiment of the securement region.

FIG. 11 shows an alternative to the securement region 6 of FIG. 8. On the basis of FIG. 11, it is shown, again by example, that it is equally well possible to assemble, preferably weld together, the securement region 6 from several parts, preferably from several extruded profiles, reformed sheet metal parts, cast parts and/or as, for example, carbon fiber reinforced composite material parts. Hereby, a continuous single-wall implementation of the steering shaft bearing unit 1 can be attained throughout. In the variant according to FIG. 11, the securement region 6 is formed of two reformed sheet metal parts. The one reformed sheet metal part becomes through reforming the securement webs 8 and the connection section. The second sheet metal part is formed by the separate metal sheet 11 with its V-shaped cross section. By inserting the separate metal sheet 11 between the securement webs 8 at their freely projecting ends 10, the opening 9 between the securement webs 8 is delimited upwardly. The securement region 6 developed thus can subsequently, for example, be installed into the steering column according to FIG. 10, instead of the securement region 6 shown in FIG. 8, thereby that it is connected, or welded, with the two circumferentially closed regions 5 for receiving the bearings for bearing the steering shaft. Regarding the V-shaped cross section of the separate metal sheet 11, reference is made to the fact that it is advantageous if the recurvature site, or the tip of the V-shaped cross section, extends in the longitudinal direction 31 or preferably in the plane of symmetry 16 of the securement region 6. In this plane of symmetry 16 extends preferably also the longitudinal axis 35 of the steering shaft 2 about which the steering shaft 2 is rotatably supported in the steering shaft bearing unit 1. However, it is also conceivable and feasible to implement the connection metal sheet in the form of a W. The faces forming the V or the W can herein also be developed in the shape of an arc.

Whenever in the preceding description sheet metal is listed as the material, it should be noted that the structural parts or the intermediate forms can be fabricated for example of sheet steel, sheet aluminum, or sheet magnesium, however also of carbon fiber composite materials or other compound materials. Instead of metal sheets, cast parts can also be employed as preshapes or finished parts. It is also conceivable and feasible to employ a mixture of different materials and different production methods for the preshaped parts for the production of the steering shaft bearing unit. The term 'metal sheet' and in particular that of 'jacket metal sheet 4', in terms of a jacket, is also to be interpreted correspondingly broadly in terms of a wall or of a jacket and is by no means limited to metallic sheets or sheets of pure metals.

To the extent applicable, all features depicted in the individual embodiments are freely combinable with one another without leaving the scope of the invention.

LEGEND TO THE REFERENCE NUMBERS

1 Steering shaft bearing unit
2 Steering shaft
3 Steering column
4 Welding seam
5 Circumferentially closed region
6 Securement region
7 Bracket part
8 Securement web
9 Opening
10 Freely projecting end
11 Separate metal sheet
12 Through-opening
13 Clamp bolt
14 Steering shaft bearing unit bead
15 Side jaw
16 Plane of symmetry
17 Bearing part
18 Bearing part securement
19 Actuation lever
20 Steering wheel adapter
21 Bearing part bead
22 Bracket part bead
23 Cam plate
24 Tightening piece
25 Clamping nut
26 Elongated hole
27 Steering shaft bearing
28 Side wall
29 Bead base
30 Length
31 Longitudinal Directions
32 Center longitudinal axis
33 Region
34 Height directions
35 Longitudinal axis
36 Hole
37 Hole
38 Swivel axis

The invention claimed is:

1. A steering shaft bearing unit for rotatably supporting a steering shaft of a steering column for a motor vehicle, comprising:
   two circumferentially closed regions each for receiving a bearing for rotatably supporting the steering shaft; and
   a securement region for securing the steering shaft bearing unit on a bracket part of the steering column, wherein in the securement region a through-opening is disposed for guiding through a clamp bolt of the steering column, and the securement region is disposed between the circumferentially closed regions,
   wherein the securement region and the circumferentially closed regions are developed as initially separate structural parts that are subsequently connected with one another,
   and wherein the circumferentially closed regions are exclusively connected with one another via the securement region disposed between them.

2. The steering shaft bearing unit as in claim 1, wherein the structural parts forming the securement region and the circumferentially closed regions are disposed sequentially in the direction of a longitudinal axis of the steering shaft.

3. The steering shaft bearing unit as in claim 1, wherein the securement region is developed unitarily.

4. The steering shaft bearing unit as in claim 3, wherein the securement region is developed unitarily of precisely one extruded profile or reformed sheet metal part.

5. The steering shaft bearing unit as in claim 1, wherein the securement region is assembled from several parts.

6. The steering shaft bearing unit as in claim 5, wherein the securement region is welded together from several extruded profiles or reformed sheet metal parts.

7. The steering shaft bearing unit as in claim 1, wherein the steering shaft bearing unit is developed in the securement region as at least regionally circumferentially closed.

8. The steering shaft bearing unit as in claim 1, wherein the steering shaft bearing unit in at least one of the securement region and the circumferentially closed regions is formed of an overall single wall.

9. The steering shaft bearing unit as in claim 1, wherein the securement region comprises at least two securement webs spaced apart from one another, each with freely projecting ends, the through-opening being one of a plurality of through-openings, and wherein in each of the securement webs one of the through-openings is disposed and the freely projecting ends are connected with one another by a separate connection metal sheet.

10. The steering shaft bearing unit as in claim 9, wherein the connection metal sheet has a V-shaped cross section.

11. The steering shaft bearing unit as in claim 1, wherein the through-opening is disposed in a steering shaft bearing unit bead in the steering shaft bearing unit.

12. A steering column for a motor vehicle, comprising a bracket part for securing the steering column on a body of the motor vehicle, the bracket part including at least two side jaws, wherein the steering shaft bearing unit as in claim 1 is disposed with the securement region between the side jaws and retained by securement webs on the side jaws.

13. A method for production of a steering shaft bearing unit as in claim 1, comprising:
   initially providing the securement region and the circumferentially closed regions as separate structural parts; and
   subsequently connecting the securement region and the circumferentially closed regions with one another.

14. A method for production of a steering shaft bearing unit as in claim 13, wherein the securement region and the circumferentially closed regions are subsequently directly welded with one another.

15. The steering shaft of claim 1, wherein the through-opening is a first through-opening, the securement region having a second through-opening for guiding the clamp bolt.

16. The steering shaft of claim 1, wherein in the securement region, two through-openings are disposed for guiding through the clamp bolt of the steering column, and the securement region and the circumferentially closed regions are directly welded with one another.

* * * * *